(12) United States Patent
Marlin et al.

(10) Patent No.: US 8,551,203 B2
(45) Date of Patent: Oct. 8, 2013

(54) FUSED ALUMINA/ZIRCONIA GRAIN MIXTURE

(75) Inventors: Samuel Marlin, Plan d'orgon (FR); David Langohr, Lagnes (FR); Anthony Gaeta, New York, NY (US)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 49 days.

(21) Appl. No.: 13/255,344

(22) PCT Filed: Mar. 11, 2010

(86) PCT No.: PCT/IB2010/051061
§ 371 (c)(1),
(2), (4) Date: Oct. 4, 2011

(87) PCT Pub. No.: WO2010/103484
PCT Pub. Date: Sep. 16, 2010

(65) Prior Publication Data
US 2012/0028544 A1  Feb. 2, 2012

(30) Foreign Application Priority Data
Mar. 11, 2009 (FR) ...................... 09 01147

(51) Int. Cl.
*B02C 4/02* (2006.01)
*C01F 7/02* (2006.01)
*C01G 25/02* (2006.01)
*C09C 1/68* (2006.01)

(52) U.S. Cl.
USPC ............... 51/309; 241/30; 501/134; 501/153

(58) Field of Classification Search
None
See application file for complete search history.

(56) References Cited

U.S. PATENT DOCUMENTS

| | | | |
|---|---|---|---|
| 3,181,939 A | 5/1965 | Marshall et al. | |
| 3,891,408 A | 6/1975 | Rowse et al. | |
| 3,993,119 A | 11/1976 | Scott | |
| 4,457,767 A | 7/1984 | Poon et al. | |
| 5,161,696 A | 11/1992 | Seider | |
| 2004/0040218 A1 | 3/2004 | Aleonard et al. | |
| 2005/0060948 A1* | 3/2005 | Rosenflanz | 51/308 |
| 2008/0028685 A1* | 2/2008 | Marlin | 51/309 |

FOREIGN PATENT DOCUMENTS

| | | |
|---|---|---|
| DE | 43 06 966 C1 | 1/1994 |
| FR | 2 787 106 | 6/2000 |
| FR | 2 872 157 | 12/2005 |

OTHER PUBLICATIONS

Nov. 25, 2009 French Search Report issued in FR 0901147 (with translation).
Dec. 14, 2010 International Search Report issued in PCT/IB2010/051061 (with translation).

* cited by examiner

*Primary Examiner* — Kaj K Olsen
*Assistant Examiner* — Jared Wood
(74) *Attorney, Agent, or Firm* — Oliff & Berridge, PLC

(57) ABSTRACT

A molten alumina/zirconia grain mixture having the following chemical composition, in wt %: $ZrO_2+HfO_2$: 35 to 45.5%; $Al_2O_3$: 43.7 to 65%; other oxides: <10%; $SiO_2$: <0.8%, which simultaneously adheres to a granulometric condition and to a densimetric condition.

15 Claims, 15 Drawing Sheets

| Abbreviated designation of the grains | Sieve 1 | | Sieve 2 | | Passing into the receptacle |
|---|---|---|---|---|---|
| | Mesh opening | Oversize on sieve 1 | Mesh opening | Cumulative oversize sieves 1+2 | |
| | a | $A_1$ | a | $A_2$ max | $\Delta A$ max |
| | mm \| µm | % | mm \| µm | % | % |
| P 12 | 3.35 \| - | 0 | 2.36 \| - | 1 | 8 |
| P 16 | 2.36 \| - | 0 | 1.70 \| - | 3 | 4 |
| P 20 | 1.70 \| - | 0 | 1.18 \| - | 7 | 4 |
| P 24 | 1.40 \| - | 0 | 1.00 \| - | 1 | 8 |
| P 30 | 1.18 \| - | 0 | - \| 850 | 1 | 8 |
| P 36 | 1.00 \| - | 0 | - \| 710 | 1 | 8 |
| P 40 | - \| 710 | 0 | - \| 500 | 7 | 4 |
| P 50 | - \| 600 | 0 | - \| 425 | 3 | 4 |
| P 60 | - \| 500 | 0 | - \| 355 | 1 | 8 |
| P 80 | - \| 355 | 0 | - \| 250 | 3 | 4 |
| P 100 | - \| 300 | 0 | - \| 212 | 1 | 8 |
| P 120 | - \| 212 | 0 | - \| 150 | 7 | 4 |
| P 150 | - \| 180 | 0 | - \| 125 | 3 | 4 |
| P 180 | - \| 150 | 0 | - \| 106 | 2 | 10 |
| P 220 | - \| 125 | 0 | - \| 90 | 2 | 10 |

FIG. 1A

| Abbreviated designation of the grains | Sieve 3 | | | Sieve 4 | | | Passing into the receptacle |
|---|---|---|---|---|---|---|---|
| | Mesh opening | | Cumulative oversize sieves 1+2+3 | Mesh opening | | Cumulative oversize sieves 1+2+3+4 | |
| | a | | $A_3$ | a | | $A_4$ | $\Delta A$ max |
| | mm | µm | % | mm | µm | % | % |
| P 12 | 2.00 | - | 14 +/- 4 | 1.70 | - | 61 +/- 9 | 8 |
| P 16 | 1.40 | - | 26 +/- 6 | 1.18 | - | 75 +/- 9 | 4 |
| P 20 | 1.00 | - | 42 +/- 8 | - | 850 | 86 +/- 6 | 4 |
| P 24 | - | 850 | 14 +/- 4 | - | 710 | 61 +/- 9 | 8 |
| P 30 | - | 710 | 14 +/- 4 | - | 600 | 61 +/- 9 | 8 |
| P 36 | - | 600 | 14 +/- 4 | - | 500 | 61 +/- 9 | 8 |
| P 40 | - | 425 | 42 +/- 8 | - | 355 | 86 +/- 6 | 4 |
| P 50 | - | 355 | 26 +/- 6 | - | 300 | 75 +/- 9 | 4 |
| P 60 | - | 300 | 14 +/- 4 | - | 250 | 61 +/- 9 | 8 |
| P 80 | - | 212 | 26 +/- 6 | - | 180 | 75 +/- 9 | 4 |
| P 100 | - | 180 | 14 +/- 4 | - | 150 | 61 +/- 9 | 8 |
| P 120 | - | 125 | 42 +/- 8 | - | 106 | 86 +/- 6 | 4 |
| P 150 | - | 106 | 26 +/- 6 | - | 90 | 75 +/- 9 | 4 |
| P 180 | - | 90 | 15 +/- 5 | - | 75 | 62 +/- 12 | 10 |
| P 220 | - | 75 | 15 +/- 5 | - | 63 | 62 +/- 12 | 10 |

FIG. 1B

| Abbreviated designation of the grains | Sieve 5 | | Cumulative oversize sieves 1+2+3+4+5 $A_5$ min | Passing into the receptacle $\Delta A$ max |
|---|---|---|---|---|
| | Mesh opening a | | | |
| | mm | μm | % | % |
| P 12 | 1.40 | - | 92 | 8 |
| P 16 | 1.00 | - | 96 | 4 |
| P 20 | - | 710 | 96 | 4 |
| P 24 | - | 600 | 92 | 8 |
| P 30 | - | 500 | 92 | 8 |
| P 36 | - | 425 | 92 | 8 |
| P 40 | - | 300 | 96 | 4 |
| P 50 | - | 250 | 96 | 4 |
| P 60 | - | 212 | 92 | 8 |
| P 80 | - | 150 | 96 | 4 |
| P 100 | - | 125 | 92 | 8 |
| P 120 | - | 90 | 96 | 4 |
| P 150 | - | 75 | 96 | 4 |
| P 180 | - | 63 | 90 | 10 |
| P 220 | - | 53 | 90 | 10 |

FIG. 1C

| Abbreviated designation of the grains | Sieve 1 | | | | Sieve 2 | | | | Passing into the receptacle |
|---|---|---|---|---|---|---|---|---|---|
| | Mesh opening | | Cumulative oversize sieve 1 | | Mesh opening | | Cumulative oversize sieve 2 | | |
| | a | | $A_1$ | | a | | $A_2$ max | | $\Delta A$ max |
| | mm | μm | % | | mm | μm | % | | % |
| F 10 | 3.35 | - | 0 | | 2.36 | - | 20 | | 3 |

FIG. 2A

| Abbreviated designation of the grains | Sieve 3 | | | | Sieve 4 | | | | Passing into the receptacle |
|---|---|---|---|---|---|---|---|---|---|
| | Mesh opening | | Cumulative oversize sieve 3 | | Mesh opening | | Cumulative oversize sieves 3+4 | | |
| | a | | $A_3$ min | | a | | $A_3 + A_4$ min | | $\Delta A$ max |
| | mm | μm | % | | mm | μm | % | | % |
| F 10 | 2.00 | - | 45 | | 1.70 | - | 70 | | 3 |

FIG. 2B

| Abbreviated designation of the grains | Sieve 5 | | | Passing into the receptacle |
|---|---|---|---|---|
| | Mesh opening | | Cumulative oversize sieves 3+4+5 | |
| | a | | $A_3 + A_4 + A_5$ min | $\Delta A$ max |
| | mm | μm | % | % |
| F 10 | 1.40 | - | 97 | 3 |

FIG. 2C

| | ZrO2 (%) | Al2O3 (%) | Y2O3 (%) | TiO2 (%) | SiO2 (%) | Impur-ities (%) | Concen-tration of nodules (number/ mm²) | Content of grains comprising inclusions (%) | Content of grains comprising primary zirconia (%) | Content of grains comprising primary corundum (%) | Loose packed density (g/cm³) |
|---|---|---|---|---|---|---|---|---|---|---|---|
| Standard NZPLUS®, P24 grit | 40.7 | 57.85 | 0.75 | 0.1 | 0.31 | 0.29 | - | - | - | - | 2.16 |
| Controlled loose packed density NZPLUS®, P24 grit | 40.7 | 57.91 | 0.71 | 0.08 | 0.37 | 0.23 | - | - | - | - | 2.06 |
| Standard mNZP, P24 grit | 44.8 | 54.27 | 0.56 | 0.09 | 0.1 | 0.18 | 3272 | 2.5 | 36 | 3 | 2.14 |
| Controlled loose packed density mNZP, P24 grit | 44.4 | 54.69 | 0.54 | 0.1 | 0.1 | 0.17 | 1230 | 0.7 | 36 | 2 | 2.04 |

FIG. 3A

| | | | | | | | | | | |
|---|---|---|---|---|---|---|---|---|---|---|
| Standard NZPLUS®, P36 grit | 39.8 | 58.86 | 0.74 | 0.08 | 0.28 | 0.24 | - | - | - | 2.01 |
| Controlled loose packed density NZPLUS®, P36 grit | 38.6 | 60.09 | 0.72 | 0.07 | 0.25 | 0.27 | - | - | - | 1.92 |
| Standard mNZP, P36 grit | 44.6 | 54.44 | 0.58 | 0.1 | 0.1 | 0.18 | 2129 | 1.2 | 39 | 5 | 2.02 |
| Controlled loose packed density mNZP, P36 grit | 44.2 | 54.77 | 0.65 | 0.1 | 0.1 | 0.18 | 4842 | 1 | 44 | <1 | 1.95 |
| Standard NZPLUS®, P40 grit | 41 | 57.51 | 0.76 | 0.13 | 0.3 | 0.3 | - | - | - | - | 1.97 |

FIG. 3B

|  |  |  |  |  |  |  |  |  |  |  |  |
|---|---|---|---|---|---|---|---|---|---|---|---|
| Controlled loose packed density NZPLUS®, P40 grit | 38.9 | 59.74 | 0.71 | 0.1 | 0.27 | 0.28 | - | - | - | - | 1.92 |
| Standard mNZP, P40 grit | 45 | 54.04 | 0.55 | 0.1 | 0.11 | 0.2 | 2307 | 0.8 | 44 | 2 | 1.97 |
| Controlled loose packed density mNZP, P40 grit | 44.4 | 54.73 | 0.53 | 0.08 | 0.1 | 0.16 | 2885 | 0.8 | 31 | 4 | 1.93 |
| Standard NZPLUS®, P50 grit | 40.3 | 58.34 | 0.76 | 0.07 | 0.26 | 0.27 | - | - | - | - | 1.99 |
| Controlled loose packed density NZPLUS®, P50 grit | 40.8 | 57.78 | 0.7 | 0.09 | 0.33 | 0.3 | - | - | - | - | 1.95 |

FIG. 3C

| | | | | | | | | | |
|---|---|---|---|---|---|---|---|---|---|
| Standard mNZP P50 grit | 44.8 | 54.28 | 0.46 | 0.08 | 0.1 | 0.28 | 3457 | 2 | 42 | 1 | 1.98 |
| Controlled loose packed density mNZP, P50 grit | 44.2 | 54.79 | 0.55 | 0.1 | 0.1 | 0.26 | 3147 | 1.5 | 35 | <1 | 1.92 |

FUSED ALUMINA/ZIRCONIA GRAIN MIXTURE

TECHNICAL FIELD

This disclosure generally relates to a mixture of fused ceramic grains essentially composed of alumina and zirconia in proportions close to the binary eutectic (42% by weight of zirconia) and exhibiting an improved abrasive performance. The disclosure also relates to an abrasive tool comprising a mixture of grains and to a process for the manufacture of a mixture of grains.

BACKGROUND

Abrasive tools are generally classified according to the form in which the constituent ceramic grains thereof are formulated: free abrasives (use in spraying or in suspension, without a support), coated abrasives (support of cloth or paper type, where the grains are positioned over several layers) and bonded abrasives (in the form of circular grinding wheels, sticks, and the like). In the latter cases, the abrasive grains are compressed with an organic or glass binder (in this case, the binder composed of oxides which is essentially silicated). These grains must themselves exhibit good mechanical properties in the abrasion (in particular toughness) and give rise to good mechanical cohesion with the binder (durability of the interface). Currently various families of abrasive grains exist which make it possible to cover a broad range of applications and of performance: grains of oxides synthesized by fusion in particular offer an excellent quality/manufacturing cost compromise.

Within the range of fused grains, materials based on alumina and zirconia are known from U.S. Pat. No. 3,181,939. These grains are generally composed of from 10 to 60% of zirconia and from 0 to 10% of an additive, the remainder being alumina. In practice, the zirconia content of commercial products is either about 25% or about the value of the alumina/zirconia eutectic located at approximately 42% of zirconia, generally from 35 to 50%, as described in the U.S. Pat. No. 3,891,408. This patent indicates that the products having a composition close to the eutectic offer a better performance in the application than aluminous grains, in particular if they are solidified very rapidly, so that, in the eutectic colonies, the interlamellar or interfiber spaces are less than 4000 Å (with eutectic colonies orientated perpendicular to the solidification front). This unique type of structure produces an excellent compromise between the mechanical strength required for maximum duration of use of the grain and the microfracturing necessary for good regeneration of the cutting surfaces.

Known additives comprise yttrium oxide, added up to 2% according to U.S. Pat. No. 4,457,767, or titanium oxide, added up to 10% according to the patent DE-C1-4306966. These additives improve the abrasiveness of the alumina/zirconia grains. Magnesium oxide is also a possible additive but, above a content of a few points, its presence results in the formation of spinel with the alumina until the corundum disappears, which results in a poor mechanical performance.

Mention may be made, as example of the grains, of the grains described in U.S. Pat. No. 4,457,767. These grains typically comprise 39% by weight of zirconia, 0.8% of $Y_2O_3$ and less than 0.5% of impurities, the remainder being alumina. Mixtures of these grains are widely used for coated abrasives or abrasive grinding wheels having an organic binder in operations having a high rate of removal of material (rough grinding, parting, and the like), in particular on stainless steel.

Also known, from FR 2 787 106 or US 2004/0040218, are grains comprising a zirconia content of between 10 and 60% and an $Al_2O_3$ content of between 38 and 90%. These fused alumina/zirconia grains are manufactured by molten raw materials in a reducing environment (within particular addition of a source of carbon, for example petroleum coke, pitch or coal, to the furnace). The molten material is subsequently cooled, preferably rapidly, in order to promote the production of fine and oriented structures, for example by means of a device for pouring between thin metal plates, such as that presented in the U.S. Pat. No. 3,993,119. The cooled material is finally ground, for example using roll mills, and then sieved and classified into a series of particle size distributions ("grits") corresponding to precise standards (for example the FEPA standard). The grains thus manufactured are compact and not very reduced. They exhibit good mechanical properties and can advantageously be used in grinding wheels having a glass binder.

Mixtures of fused alumina/zirconia abrasive grains are also described in FR 2 872 157. They exhibit noteworthy abrasive properties, in particular under certain low-pressure grinding conditions on a stainless steel or more generally on a steel having a high carbon content and of high hardness.

The abrasive properties of the abrasive tools decline as they are used, until they are rendered unemployable.

U.S. Pat. No. 5,161,696 discloses the use of blocky brown fused alumina grains exhibiting an aspect ratio of less than 2:1 for bonded abrasives, the powders used comprising, however, between 20% and 30% of sharp brown fused alumina grains exhibiting an aspect ratio of greater than 3:1. For coated abrasives, this document discloses the use of sharp brown fused alumina grains, the powders used being able, however, to comprise up to from 30% to 40% of blocky grains.

There thus exists an ongoing need for a mixture of fused alumina/zirconia abrasive grains exhibiting a greater lifetime. One aim of the embodiments of the present disclosure is to meet this need.

SUMMARY

In embodiments, the above aim is achieved by means of a mixture of fused alumina/zirconia grains exhibiting the following chemical analysis, as percentages by weight:

$ZrO_2$+$HfO_2$: 35-45.5%
$Al_2O_3$: 43.7-65%
$SiO_2$: <0.8%
Other oxides: <10%;

this mixture of grains being noteworthy in that it exhibits a loose packed density, or LPD, observing at least one of the following criteria:

(1) more than 97% by weight of the grains do not pass through a sieve of square mesh with a side length of 1400 µm and less than 20% by weight of the grains do not pass through a sieve of square mesh with a side length of 2360 µm (particle size condition C1), and the loose packed density is greater than 2.18, preferably greater than 2.22, and less than 2.43, preferably less than 2.36 (densimetric condition D1);

(2) more than 96% by weight of the grains do not pass through a sieve of square mesh with a side length of 1000 µm and less than 3% by weight of the grains do not pass through a sieve of square mesh with a side length of 1700 µm (particle size condition C2), and the loose packed density is greater than 2.04, preferably greater than 2.08, and less than 2.26, preferably less than 2.19, preferably less than 2.17 (densimetric condition D2);
(3) more than 92% by weight of the grains do not pass through a sieve of square mesh with a side length of 600 μm and less than 18% by weight of the grains do not pass through a sieve of square mesh with a side length of 850 μm (particle size condition C3), and the loose packed density is greater than 1.94, preferably greater than 1.98, and less than 2.17, preferably less than 2.10, preferably less than 2.08, preferably less than 2.05 (densimetric condition D3);
(4) the mixture of grains exhibits a content of grains comprising inclusions of less than 5%, preferably of less than 2%, the concentration of nodules, measured over a cross section of any grain of said mixture, being greater than 500 nodules per mm² in at least 50% of the grains examined, more than 92% by weight of the grains do not pass through a sieve of square mesh with a side length of 425 μm and less than 18% by weight of the grains do not pass through a sieve of square mesh with a side length of 600 μm (particle size condition C4), and the loose packed density is greater than 1.85, preferably greater than 1.89, and less than 2.05, preferably less than 2.00, preferably less than 1.91 (densimetric condition D4);
(5) the mixture of grains exhibits a content of grains comprising inclusions of less than 5%, preferably of less than 2%, the concentration of nodules, measured over a cross section of any grain of said mixture, being greater than 500 nodules per mm² in at least 50% of the grains examined, more than 96% by weight of the grains do not pass through a sieve of square mesh with a side length of 300 μm and less than 7% by weight of the grains do not pass through a sieve of square mesh with a side length of 500 μm (particle size condition C5), and the loose packed density is greater than 1.83, preferably greater than 1.86, and less than 2.00, preferably less than 1.97, and even less than 1.96 or less than 1.95 (densimetric condition D5);
(6) the mixture of grains exhibits a content of grains comprising inclusions of less than 5%, preferably of less than 2%, the concentration of nodules, measured over a cross section of any grain of said mixture, being greater than 500 nodules per mm² in at least 50% of the grains examined, more than 96% by weight of the grains do not pass through a sieve of square mesh with a side length of 250 μm and less than 3% by weight of the grains do not pass through a sieve of square mesh with a side length of 425 μm (particle size condition C6), and the loose packed density is greater than 1.82, preferably greater than 1.86, and less than 1.95, preferably less than 1.93 (densimetric condition D6);
(7) the mixture of grains exhibits a content of grains comprising inclusions of less than 5%, preferably of less than 2%, the concentration of nodules, measured over a cross section of any grain of said mixture, being greater than 500 nodules per mm² in at least 50% of the grains examined, more than 96% by weight of the grains do not pass through a sieve of square mesh with a side length of 150 μm and less than 3% by weight of the grains do not pass through a sieve of square mesh with a side length of 250 μm (particle size condition C7), and the loose packed density is greater than 1.79, preferably greater than 1.83, and less than 1.93, preferably less than 1.91 (densimetric condition D7).

DETAILED DESCRIPTION OF EMBODIMENTS

As will be seen in more detail in the continuation of the description and contrary to the teaching of U.S. Pat. No. 5,161,696, the inventors have discovered that it is not sufficient to increaser the amount of abrasive grains exhibiting an elongated shape in order to increase the lifetime of the grains. This is because they have demonstrated that this effect is conditioned by the chemical composition of the grains and that, for a specific range of compositions, a precise correlation between the loose packed density of a mixture and its particle size distribution is essential.

A mixture of grains of the present disclosure can also exhibit one or more of the following characteristics:
As percentage by weight:
  $ZrO_2+HfO_2$: 38-45.5%
  $Al_2O_3$: 43.7-62%
  $SiO_2$: <0.8%
  Other oxides: <10%.
As percentage by weight:
  $ZrO_2+HfO_2$: 40-45.5%
  $Al_2O_3$: 43.7-60%
  $SiO_2$: <0.8%
  Other oxides: <10%.
As percentage by weight:
  $ZrO_2+HfO_2$: 42-45%
  $Al_2O_3$: 44.2-58%
  $SiO_2$: <0.8%
  Other oxides: <10%.
The "other oxides" comprise at least one additive preferably chosen from the group formed by yttrium oxide, titanium oxide, magnesium and calcium oxides, neodymium, lanthanum, cerium, dysprosium and erbium oxides, oxides of any other compound of the family of the rare earth metals, and a mixture of these.
As percentage by weight:
  $Y_2O_3$: 0.1-1.2%, and/or
  $TiO_2$: <3%, and/or
  $SiO_2$: <0.4%.
The content of titanium oxide $TiO_2$ is less than 0.5%, less than 0.2%, indeed even less than 0.15%.
$Y_2O_3 \geq 0.4\%$ and/or $Y_2O_3$: ≤0.6%.
Impurities: <1.2%.
The grains observing the criterion (1), (2), (3), (4), (5), (6) or (7) exhibit an F10, P16, P24, P36, P40, P50 or P80 grit respectively, the grits being measured according to the FEPA standard, Standard 42-GB-1984, R1993, for the F10 grits and according to the FEPA standard, Standard 43-GB4984, R1993, for the P16, P24, P36, P40, P50 or P80 grits, of the Fédération Européenne des Fabricants de Produits Abrasifs [Federation of European Producers of Abrasives], commonly used in the field of abrasive grains.

In embodiments, a mixture of grains exhibits a content of grains comprising inclusions of less than 5%, preferably of less than 2%, the concentration of nodules, measured over a cross section of any grain of said mixture, being greater than 500 nodules per mm² in at least 50%, preferably 80%, more preferably 90%, of the grains examined.

Mixtures of fused alumina/zirconia abrasive grains exhibiting this microstructure are, for example, described in FR 2 872 157. The name "mNZP" denotes the chemical composition and the microstructure of the mixtures of the grains described in FR 2 872 157.

Surprisingly, the inventors have discovered that observing at least one of the above criteria (1) to (7) makes it possible to increase in an extraordinary way the lifetimes of the grains when the mixture of grains is a mixture of mNZP grains. The lifetimes obtained can thus be 30%, 40% or indeed even 50% greater than those obtained from the mixtures of grains today.

A mixture of grains according to another embodiment can also exhibit one or more of the following characteristics:

- The proportion of grains exhibiting a concentration of nodules of greater than 500 nodules per mm$^2$ is, as percentage by number, at least 50%, preferably 80%, more preferably 90%. More preferably, substantially all the grains of the mixture (at least 99%) exhibit such a concentration of nodules.
- Said concentration of nodules is between 600 and 3500 nodules per mm$^2$, the content of grains of the mixture comprising inclusions remaining less than 5%, preferably less than 4%, more preferably less than 2%.
- Said concentration of nodules is greater than 600 nodules per mm$^2$, preferably than 900 nodules per mm$^2$
- Said concentration of nodules is less than 3500 nodules/mm$^2$, than 2500 nodules/mm$^2$, preferably than 2000 nodules/mm$^2$, more preferably than 1500 nodules/mm$^2$.
- Said mixture exhibits a content of grains comprising inclusions of at most 1.5%.
- The content of grains comprising primary zirconia is between 20 and 45%.
- The content of grains comprising primary corundum is between 0 and 20%, preferably between 0 and 10%.
- The subset formed by the grains of said mixture having a size of between 500 and 600 µm exhibits a content of grains comprising inclusions of less than 2%, preferably 1.5%, and/or a content of grains comprising primary zirconia of between 20 and 45% and/or a content of grains comprising primary corundum of between 0 and 20%.

In embodiments, a mixture of grains can also comprise one or more of the characteristics relating to the microstructure and to the composition of the grains of a mixture of grains as described in FR 2 872 157, incorporated by way of reference.

Another embodiment also relates to an abrasive tool comprising a mixture of abrasive grains bonded by a binder or deposited as a layer on a flexible support and retained by a binder, noteworthy in that said mixture is in accordance with the present disclosure.

Yet another embodiment also relates to a process for the manufacture of a mixture of grains according to the present disclosure, comprising the following successive stages:

A') Determination of whether one of the particle size conditions of one of the criteria (1) to (7) is met;
B') In this case, adaptation of the loose packed density so as to observe the corresponding densimetric condition.

The adaptation of the loose packed density can be carried out in various ways.

In particular, in order to modify the loose packed density of a mixture of grains, it is possible to vary the amount of elongated grains thereof.

For example, in stage B'), it is possible to add, to the mixture of grains, another mixture of grains, preferably of the same nature (composition, microstructure), preferably also observing said particle size condition (in order to prevent said particle size condition from no longer being observed by the mixture resulting from the addition), but the grains of which exhibit, on average, a different morphology. For example, the addition of such a mixture of grains exhibiting, on average, a more elongated form makes it possible to reduce the loose packed density.

It is also possible, in stage B'), to grind the mixture of grains so as to modify the mean morphology of the grains. For example, limiting the number of passes through a roll mill increases the proportion of elongated grains and thus reduces the loose packed density. However, this procedure can result in a mixture of grains no longer observing said particle size condition.

Furthermore, the grinding procedure conventionally used with a roll mill consists of returning a portion of the grains which have passed through the mill upstream of the mill. Each grain thus passes, on average, two or three times through the mill. This results in a substantial increase in the loose packed density.

The tests show that such a conventional grinding results, for grains exhibiting compositions and microstructures in accordance with those of the grains of a mixture of the present disclosure, in greater loose packed densities than those of the mixtures of grains of the present disclosure.

In embodiments, in order to manufacture a mixture of grains in accordance with the present disclosure, use is made of a roll mill, preferably adjusted so that the rolls are separated by a distance "e" of less than or equal to 2 mm, preferably of less than 1 mm, preferably in contact (no separation between rolls). More preferably, the minimum force for separating the rolls from one another, "F", is greater than 0.15 kN, preferably greater than 0.2 kN, and even greater than 0.23 kN, and/or less than $3.1 \times (e)^2 + 22.81 \times (e) + 2$ kN, "e" being expressed in mm. Preferably, the rolls are in contact (i.e., e=0) and the minimum separating force F is less than 1.5 kN, preferably less than 1 kN, preferably less than 0.5 kN.

Another embodiment relates to a process for grinding fused alumina/zirconia grains, in which the grains are ground by a single pass through a roll mill comprising at least two rolls separated by a distance "e" of less than or equal to 2 mm, preferably of less than 1 mm, preferably in contact, with application of a minimum separating force "F" of greater than 0.15 kN, preferably of greater than 0.2 kN, indeed even of greater than 0.23 kN, and/or of less than $3.1 \times (e)^2 + 22.81 \times (e) + 2$ kN, "e" being expressed in mm. Preferably, the rolls are in contact (i.e., e=0) and the minimum separating force F is less than 1.5 kN, preferably less than 1 kN, preferably less than 0.5 kN.

A process which can be used to manufacture a mixture of grains in accordance with the present disclosure can comprise the following stages:

A) mixing starting materials chosen so that the grains of the mixture obtained on conclusion of stage D) have a chemical composition in accordance with that of the grains of a mixture according to the present disclosure,
B) melting the mixed starting materials until a molten liquid is obtained, for example in an electric arc furnace,
C) cooling the molten liquid by dipping, preferably so that the molten liquid is completely solidified in less than 3 minutes, for example by dipping, until a solid body is obtained,
D) grinding the solid body so as to obtain a mixture of grains, in particular by means of a roll mill,
E) checking, for example by sampling, the concentration of nodules in the grains and the content of grains comprising inclusions of the mixture of grains obtained and, if appropriate, repeating stages A) to D) while modifying the parameters of stages B) and/or C),
F) optionally, sieving the grains obtained in stage D), and
G) monitoring whether the mixture of grains obtained on conclusion of stage D) or of stage F) observes one of the criteria (1) to (7) and, if this is not the case, modifying said mixture, for example by an additional milling and/or an additional sieving or a mixing with another mixture exhibiting different characteristics, so it observes one of said criteria.

Other characteristics of this process can also be drawn from FR 2 872 157. This document also provides details of the nature and the microstructure of the mNZP grains and of their advantageous properties.

DEFINITIONS

The loose packed density of a mixture of grains is the weight of grains present in a defined volume, without application of a stress targeted at increasing said weight. The loose packed density is measured according to the standard ANSI B74.4-1992, with use of the test Unit A.

The contents of oxides of a grain of the mixture according to the present disclosure, refers to the overall contents for each of the corresponding chemical elements, expressed in the form of the most stable oxide, according to the standard convention of the industry; the suboxides and optionally nitrides, oxynitrides, carbides, oxycarbides, carbonitrides or even the metallic entities of the abovementioned elements are thus included.

The term "impurities" is understood to mean the inevitable constituents necessarily introduced with the starting materials. In particular, the compounds forming part of the group of the oxides, nitrides, oxynitrides, carbides, oxycarbides, carbonitrides and metal entities of sodium and other alkali metals, iron, vanadium and chromium are impurities. Mention may be made, by way of examples, of CaO, $Fe_2O_3$ or $Na_2O$. The residual carbon forms part of the impurities of the composition of the products according to the present disclosure. On the other hand, hafnium oxide is not regarded as an impurity.

In a product obtained by fusion, $HfO_2$ cannot be chemically dissociated from $ZrO_2$. In the chemical composition of such a product, $ZrO_2+HfO_2$ thus denotes the total content of these two oxides. However, in embodiments of the present disclosure, $HfO_2$ is not deliberately added to the starting charge. $HfO_2$ thus denotes only the traces of hafnium oxide, this oxide always being naturally present in the sources of zirconia at contents generally of less than 2%. For the sake of clarity, the content of zirconia and of trace of hafnium oxide can thus be denoted without distinction by $ZrO_2+HfO_2$ or by $ZrO_2$ or also by "zirconia content".

The term "additive" covers the additives normally used in the manufacture of fused alumina/zirconia grains, in particular zirconia stabilizers and especially yttrium oxide and titanium oxide. Also included are magnesium oxide, calcium oxide and other oxides of rare earth metals, in particular that of neodymium but also those of lanthanum, cerium, dysprosium and erbium. The term "additive" also comprises the mixtures of said entities.

In embodiments, the fused alumina/zirconia grains of the mixture of the present disclosure exhibit a $ZrO_2+HfO_2$ content of between 35% and 45.5%, in order to promote the formation of eutectic structures.

In embodiments, the zirconia of the grains of the mixture may be present predominantly in its tetragonal allotropic form, at the expense of the monoclinic form.

The term "nodule" is used to describe a particle, the main constituent of which is a metal or a combination of metals (generally Al, Zr, ZrSi) or is a carbide or a combination of carbides (generally ZrC, AlC) and the size of which is less than or equal to 10 µm. The nodules exist mainly in the form of substantially spherical and discrete (isolated from one another) particles within a grain. The concentration of nodules is the number of nodules per $mm^2$ of surface area of a cross section of a grain.

The term "inclusion" refers to a string or a cluster of particles, the main constituent of which is a carbide or a combination of carbides, generally ZrC, in contact with one another, the size of an inclusion being greater than 10 µm. An inclusion generally exists in an elongated form. The content of grains comprising inclusions is the percentage by number of grains comprising at least one inclusion.

The "size" of a nodule or of an inclusion is defined by its greatest dimension measured in the plane of observation of a polished cross section.

The term "primary zirconia" commonly refers to a dendrite, the main constituent of which is zirconia. The content of grains comprising primary zirconia is given by the ratio, expressed as percent, of the number of grains exhibiting primary zirconia to the total number of grains studied on a polished cross section. The primary zirconia appears light gray in color under a microscope, as represented in FIG. 9.

The term "primary corundum" commonly refers to a dendrite, the main constituent of which is alumina. The content of grains comprising primary corundum is given by the ratio, expressed in percent, of the number of grains exhibiting primary corundum to the total number of grains studied on a polished cross section. As represented in FIG. 8, the primary corundum appears dark gray in color under a microscope.

The term "dendrite" conventionally refers to a crystal obtained after growth from a seed and having a fractal or pseudofractal geometry.

The term "main constituent" is understood to mean the constituent having the highest content by weight. Generally, and without this being limiting, this content by weight is greater than 50%, indeed even greater than 80%.

The term "fused grain" or more broadly "fused product" is understood to mean a solid grain (or product) obtained by solidifying, by cooling, a molten material.

A "molten material" is a liquid body which may comprise a few solid particles but in an amount insufficient for them to be able to give structure to said body. In order to retain its shape, a molten material has to be contained within a receptacle.

The term "minimum separating force" of the rolls of a roll mill refers to the minimum force which it is necessary to exert in order to increase the separation of one roll with respect to the other starting from the resting position. The minimum separating force is adjusted "offload", that is say in the absence of grains to be ground, conventionally by application of a pressure referred to as "offload pressure".

As represented in FIG. 10, a roll mill conventionally comprises first and second rolls, denoted R1 and R2 respectively, separated at rest, or "offload", by a distance "e". In this example, the first roll R1 is stationary and the second roll R2 is fitted in movable fashion, so as to be able to move away from the first roll starting from its resting position (as represented).

In the resting position, the minimum separating force holds the roll R2 against stops B1 and B2, positioned so as to provide a separation by a distance "e". The minimum separating force is the force F, represented by the arrows, which tends to push the first and second rolls toward one another and which it is necessary to exceed in order to separate them from one another beyond the distance "e". In service, grains with dimensions of greater than "e" and which are difficult to break up may, during their passage, exert a separating force greater than F on the rolls and thus separate these rolls so as to pass through them.

In the present description, unless otherwise mentioned, all the compositions of a grain are given as percentages by weight, on the basis of the total weight of the grain.

BRIEF DESCRIPTION OF THE DRAWINGS

Other characteristics and advantages of the present invention will become apparent on reading the above description and on examining the appended drawings, in which:

FIGS. 1A to 1C provide in particular the particle size characteristics of the P16, P24, P36, P40, P50 and P80 grits;

FIGS. 2A to 2C provide the particle size characteristics of the F10 grit;

FIGS. 3A to 3D provide the chemical characteristics and the loose packed density of the mixtures tested;

FIG. 4 provides a graphical representation of the machining results for a pressure on the belt which makes possible a rate of removal of metal of 5.9 in$^3$/min/in;

FIG. 5 provides a graphical representation of the machining results for a pressure on the belt which makes possible a rate of removal of metal of 2.3 in$^3$/min/in;

EXAMPLES

The following nonlimiting examples are given with the aim of illustrating various features of the present disclosure.

Figure 6:
FIGS. 6 to 9 represent photographs of the surface of a grain of a mixture of mNZP grains on which have been respectively circled the nodules, an inclusion, a primary corundum dendrite and a primary zirconia dendrite.

The concentration of nodules, the content of grains comprising inclusions, the content of grains comprising primary zirconia and the content of grains comprising primary corundum are also measured by visual analysis of photographs. The photographs (FIGS. 6 to 9) are obtained by virtue of a Reichert® microscope connected to an image analysis station equipped with Visilog® software. The measurements are earned out on a polished cross section, with a diameter of 25 mm, of a cylindrical combination composed of abrasive grains of the mixture embedded in a transparent organic resin, the grains incorporated in the polished cross section exhibiting a size which is a function of the criterion (1) to (7), as defined in table 1 below:

In the photographs taken under the microscope, the nodules appear as very bright light gray (see FIG. 6).

In order to evaluate the concentration of nodules, the microscope is adjusted to a magnification M1, as defined in table 1 above. The number of bright white points with dimensions of less than or equal to 10 μm, symptomatic of the presence of nodules, is subsequently counted. By dividing the number of nodules by the surface area of the region examined, a number of nodules per mm$^2$ of surface area of the polished cross section of a grain is obtained. The calculation is repeated over two other regions of the polished cross section of the grain. The mean of the three measurements gives the concentration of nodules for a given sample.

Figure 7:
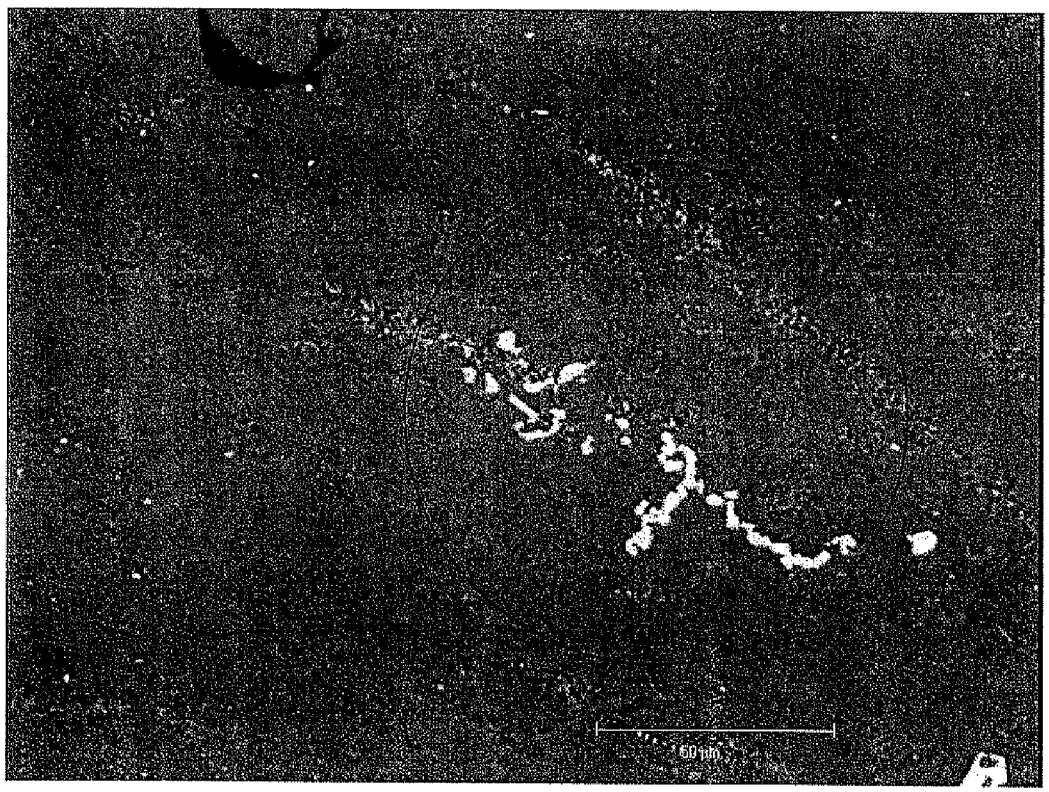
Figure 8:
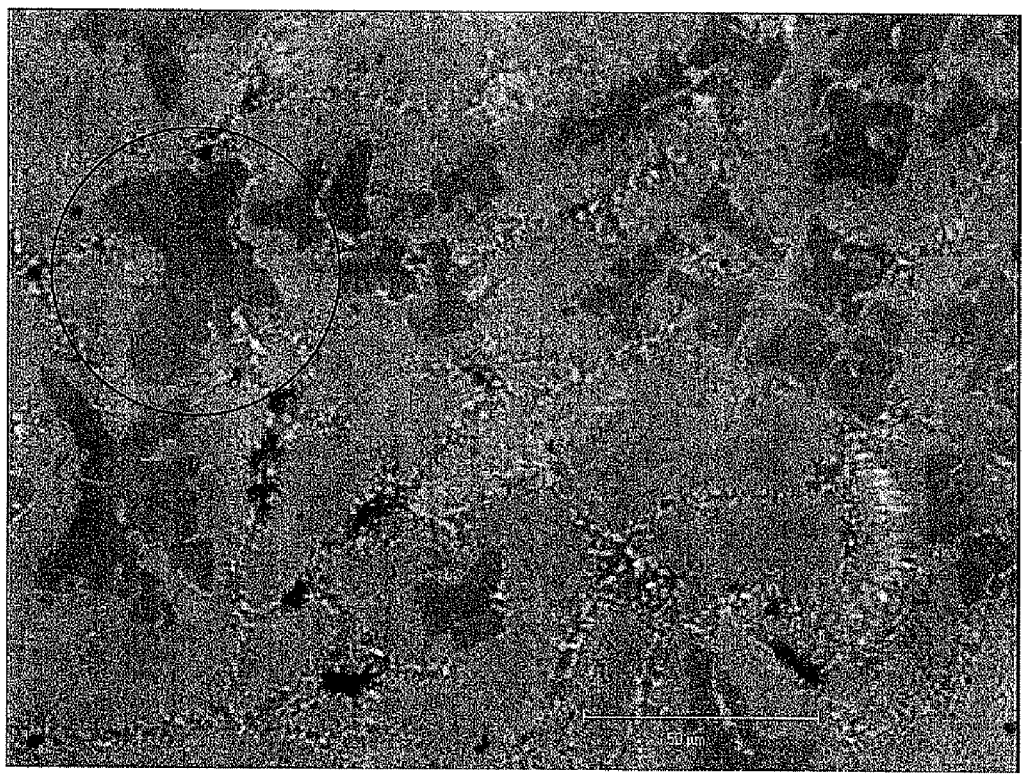
Figure 9:
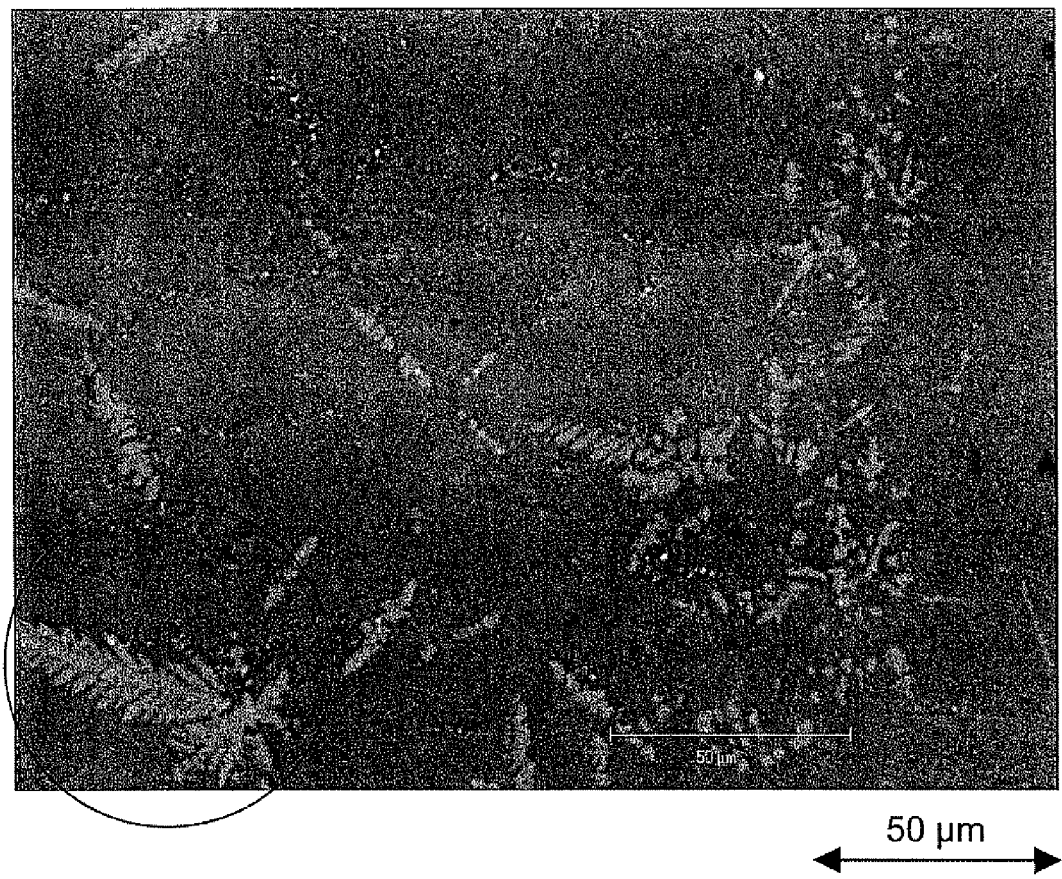
Figure 10:
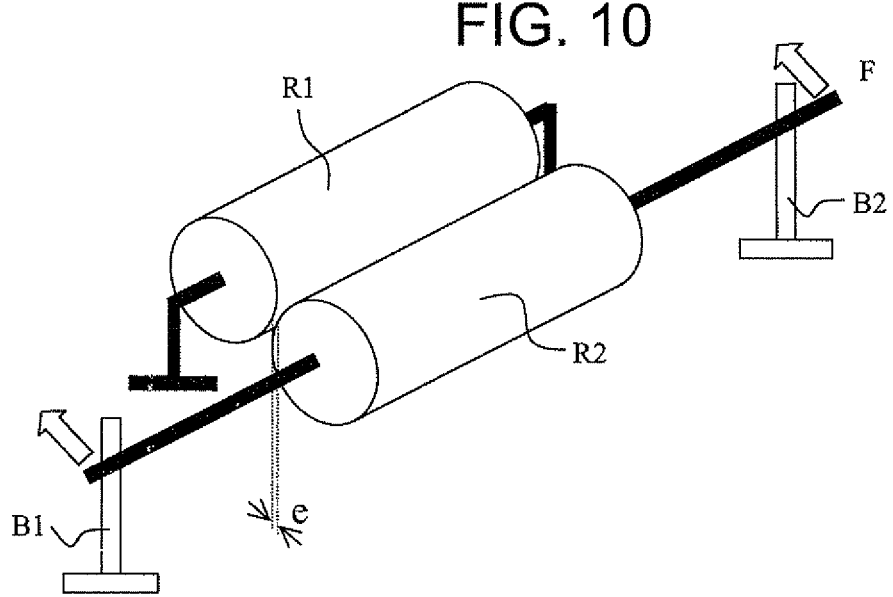
FIG. 10 diagrammatically represents a roll mill.

Inclusions appear as very bright light gray under the microscope (see photograph of FIG. 7). However, the carbide-comprising nature of the inclusions renders them less bright than the nodules of metallic nature and thus makes it possible to easily distinguish them from the nodules by optical microscopy.

In order to evaluate the content of grains comprising inclusions, the microscope is adjusted to a magnification of M2, as defined in table 1 above. The number of grains having at least one visible inclusion is subsequently counted on the displayed image. The counting is carried out over the entire surface of the polished cross section with a diameter of 25 mm. A grain is regarded as having an inclusion when at least one bright mark of carbide-comprising origin of greater than 10 μm is noticed within the grain. The value of the content of grains comprising inclusions is given by the ratio of the number of grains having at least one inclusion to the number of grains counted.

In order to evaluate the content of grains comprising primary corundum, the microscope is adjusted to a magnification M3, as defined in table 1 above. The number of grains having primary corundum dendrites and the number of grains devoid of primary corundum are subsequently counted until 100 grains of one or other of the categories have been counted. A grain is regarded as having primary corundum when at least one primary corundum dendrite is noticed within the grain. The value for the content of grains comprising primary corundum is given by the ratio, expressed as percent, of the number of grains having primary corundum to the total number of grains counted.

In order to evaluate the content of grains comprising primary zirconia, the microscope is adjusted to a magnification M3, as defined in table 1 above. The number of grains having primary zirconia dendrites and the number of grains devoid of primary zirconia are subsequently counted until 100 grains of one or other of the categories have been counted. A grain is regarded as having primary zirconia when at least one primary zirconia dendrite is noticed within the grain. The value for the content of grains comprising primary zirconia is given by the ratio, expressed as percent, of the number of grains having primary zirconia to the total number of grains counted.

The lifetimes of various mixtures of grains were compared:
(i) mixtures of NZPLUS® grains, exhibiting a composition and a microstructure which are in accordance with those of the grains described in U.S. Pat. No. 4,457,767, referred to as "standard NZPLUS®";

TABLE 1

| Criterion | Size of the grains withdrawn for observation (μm) | Magnification used for observation of the nodules (M1) | Magnification used for observation of the inclusions (M2) | Magnification used for observation of the primary zirconia and/or of the primary corundum (M3) |
|---|---|---|---|---|
| (1) | 2000-2360 | 80x | 20x | 40x |
| (2) | 1180-1400 | 160x | 40x | 80x |
| (3) | 710-850 | 200x | 50x | 100x |
| (4) | 500-600 | 200x | 50x | 100x |
| (5) | 425-500 | 200x | 50x | 100x |
| (6) | 300-355 | 200x | 50x | 100x |
| (7) | 180-212 | 400x | 100x | 200x |

(ii) mixtures of mNZP grains, exhibiting a composition and a microstructure which are in accordance with those of the grains described in FR 2 872 157, referred to as "standard mNZP";

(iii) mixtures obtained from a mixture of NZPLUS® grains but observing one of the criteria (1) to (7), referred to as "controlled loosed packed density NZPLUS®;

(iv) mixtures obtained from mixtures of mNZP grains but observing one of the criteria (1) to (7), referred to as "controlled loose packed density mNZP".

The products given as examples were prepared from the following starting materials:

Undercalcined BAYER® alumina with a sodium hydroxide content of less than 0.3%;

Zirconia powder with a zirconia+hafnium content of greater than 98% for the mNZP product;

Zirconia powder with a zirconia+hafnium content of greater than 85% for the NZPLUS® product;

Petroleum coke;

Aluminum metal turnings.

Yttrium oxide, used as additive, is contributed by pure materials comprising more than 98% of yttrium oxide.

The chemical compositions and the loose packed densities of the mixtures tested are provided in the table in FIGS. 3A to 3D.

The content of impurities (part from residual carbon) varies between 0.3 and 0.8%. The remainder corresponds to the content of alumina.

The grains were prepared according to the conventional process well known to a person skilled in the art: mixing the starting materials, melting in a single-phase electric arc furnace of Héroult type comprising graphite electrodes, with a furnace vessel with a diameter of 0.8 in, a voltage of 105-150 V, a current of 2200 to 2500 A and a supplied specific electric energy of 2.2 to 2.8 kWh/kg charged. A minimum of 0.5% (up to 3%) of petroleum coke, according to the state of the furnace, and approximately from 0.5 to 5.5% of aluminum turnings are introduced into the composition charged. The molten liquid is subsequently suddenly cooled by means of a device for pouring between thin metal plates, such as that presented in the U.S. Pat. No. 3,993,119.

In order to prepare the mixtures (i) and (ii), the solid bodies are ground and classified according to their particle size (FEPA standard). The grinding is carried out with the two rolls of the mill in contact with one another and a minimum separating force F equal to 3 kN. In contrast to the conventional adjusting, which comprises recirculation of the grains so that, on average, each grain passes through the mill between two and three times, the grinding carried out does not comprise recirculation. All the grains thus pass only a single time between the rolls of the mill. This results in a slightly lower loose packed density than that of conventional NZPLUS® and NZP mixtures.

In order to prepare the mixtures (iii) and (iv), the solid bodies of NZPLUS® and of mNZP respectively are crushed using a jaw crusher and then sieved using a sieve of 4 mesh (4760 microns). The NZPLUS® and mNZP grains respectively which pass through this sieve are ground in a model BLC 200×200 roll mill manufactured by Clero, in a single pass, at a throughput of 60 kg/h and at a minimum separating force F of 0.25 kN. The two rolls are in contact.

The NZPLUS® and mNZP grains respectively are subsequently sieved using appropriate sieves, so as to obtain the various grits desired, using a SWECO® separator, model 600 LS 24 S 544. Monitoring carried out to ensure is subsequently that one of the criteria (1) to (7) is observed.

In order to evaluate the lifetime of the mixtures of grains, the mixtures were attached to abrasive belts using a conventional electrostatic deposition process.

Steel parts were machined, always in the same way, by means of these abrasive belts, the pressure of the belts on the parts being kept constant and adjusted so that the rate of removal of metal (expressed as inch×inch×inch, or $in^3$) per minute and per inch of abrasive belt is 2.3 $in^3$/min/in and 5.9 $in^3$/min/in. The number of parts which could be machined (parts to burn) before the appearance of signs of burning on the machined parts was counted.

Figure 4:
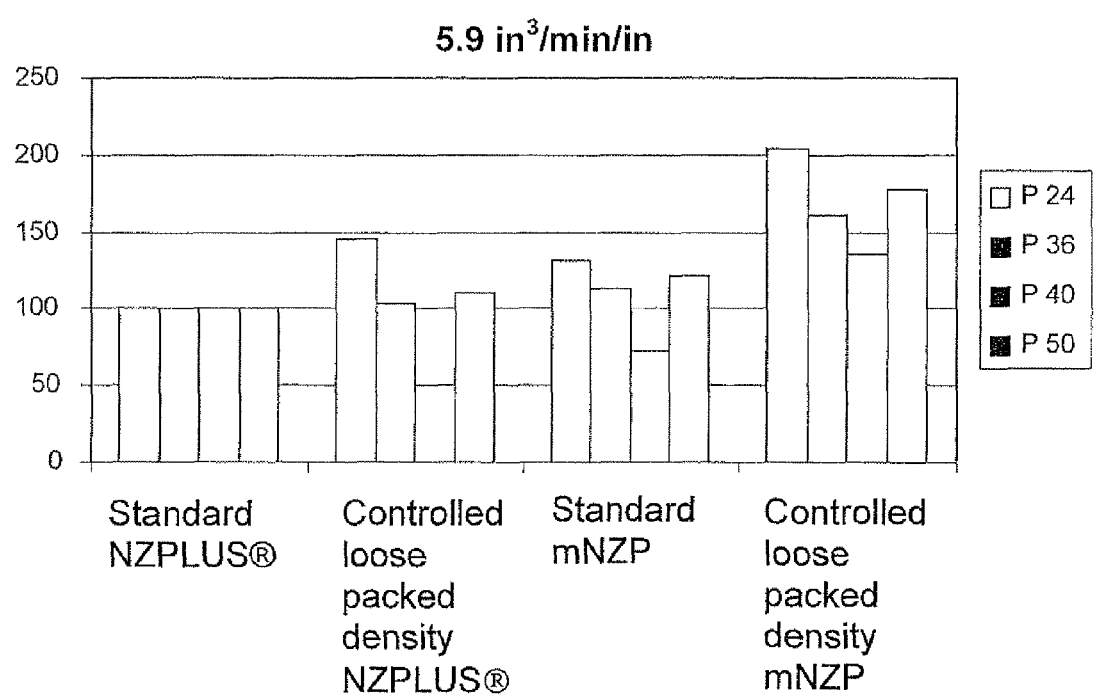

The results obtained are provided in table 2 and represented graphically in FIG. 4 for a pressure on the belt which makes possible a rate of removal of metal of 5.9 $in^3$/min/in:

TABLE 2

|  | P 24 | P 36 | P 40 | P 50 |
|---|---|---|---|---|
| Standard NZPLUS ® | 100 | 100 | 100 | 100 |
| Controlled loose packed density NZPLUS ® | 144.6 | 103.1 | — | 111 |
| Standard mNZP | 131.5 | 113.8 | 72.5 | 122 |
| Controlled loose packed density mNZP | 204 | 160 | 135 | 178 |

Figure 5:
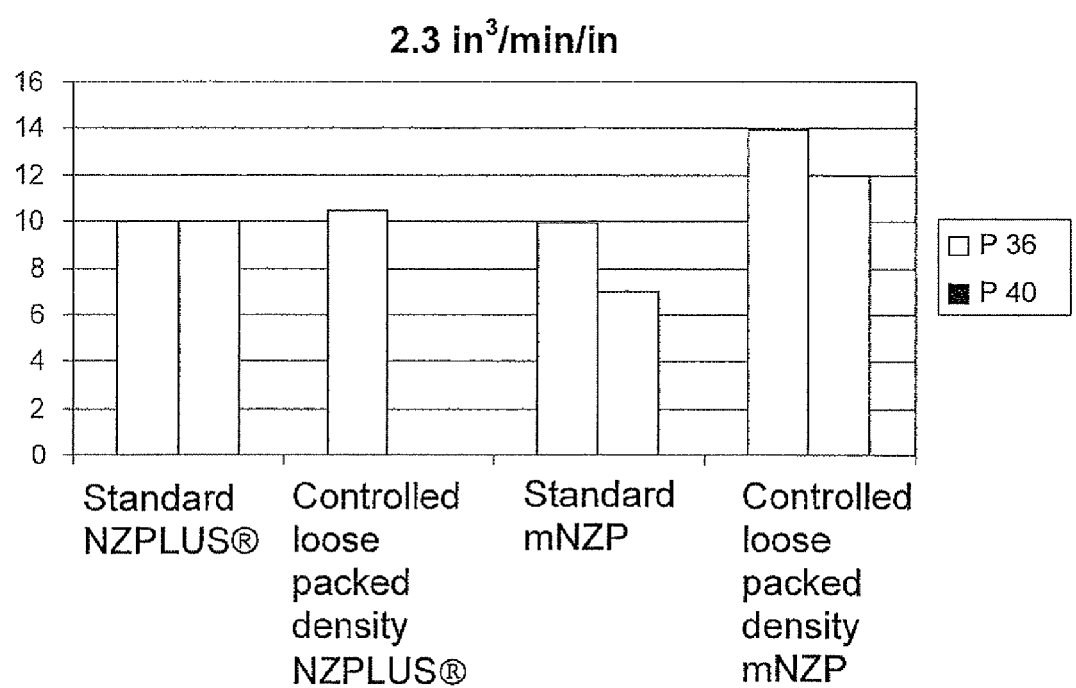

The results obtained are provided in table 3 and are represented graphically in FIG. 5 for a pressure on the belt which makes possible a rate of removal of metal of 23 $in^3$/min/in:

TABLE 3

|  | P 36 | P 40 |
|---|---|---|
| Standard NZPLUS ® | 100 | 100 |
| Controlled loose packed density NZPLUS ® | 104.3 | — |
| Standard mNZP | 98.8 | 69.8 |
| Controlled loose packed density mNZP | 139.5 | 119.4 |

Tables 2 and 3 show first that, contrary to the teaching of U.S. Pat. No. 5,161,696, in a coated abrasive, a reduction in the loose packed density may not substantially improve the lifetime of the abrasive. Thus, for a particle size P36, the change from standard NZPLUS® to the controlled loose packed density NZPLUS® has virtually no impact on the performance.

These tables also show the considerable importance of the particle size distribution in producing an improvement in the lifetime of the abrasive. Thus, for a particle size P24, the change from standard NZPLUS® to the controlled loose packed density NZPLUS® considerably improves the performance of the mixture, whereas it does not substantially improve it for a particle size P36.

A comparison of the performances of the NZPLUS® grains and mNZP grains also shows the considerable impact of the chemical composition and of the microstructure.

Thus, for a pressure on the belt which makes possible a rate of removal of metal of 5.9 in$^3$/min/in, the use of mixtures of "controlled loose packed density" grains in place of mixtures of "standard" grains results in an improvement by a factor of 1.44 for the NZPLUS® grains and of 1.55 for the mNZP grains with the P24 grit;

an improvement by a factor of 1.03 for the NZPLUS® grains and of 1.41 for the mNZP grains with the P36 grit;

an improvement by a factor of 1.86 for the mNZP grains with the P40 grit;

an improvement by a factor of 1.11 for the NZPLUS® grains and of 1.46 for the mNZP grains with the P50 grit.

While the effects of a change in shape of the grains used is variable for the NZPLUS® grains, this effect is always outstandingly positive for the mNZP grains. Unexpectedly, the inventors have thus demonstrated a true synergy between the characteristics of composition and of shape.

In order to obtain this synergy, the criterion of shape must, however, be adapted to the particle size of the powder.

Likewise, for a pressure on the belt which makes possible a rate of removal of metal of 2.3 in$^3$/min/in, the use of mixtures of "controlled density" grains in place of mixtures of "standard" grains results in:

an improvement by a factor of 1.04 for the NZPLUS® grains and of 1.41 for the mNZP grains with the P36 grit;

an improvement by a factor of 1.71 for the mNZP grains with the P40 grit.

The inventors have thus discovered, for a specific range of chemical compositions, conditions to be imposed on the loose packed density and on the particle size distribution of a mixture of grains in order to improve its performance.

The effect of the grinding conditions on the loose packed density for grains exhibiting the composition and the microstructure of the mNZP grains is illustrated in the following table 4.

In table 4, the "comparative" mixtures are those obtained from a grinding in a roll mill carried out with no separation between the rolls and with recirculation of the grains. The "controlled loose packed density" mixtures are obtained by a grinding in a roll mill, the rolls being in contact, the grains passing only a single time through the mill (no recirculation) and the minimum separating force F for the rolls being adjusted to 0.25 kN.

The effectiveness of this adjusting in producing mixtures of grains according to the present disclosure is illustrated in table 4.

TABLE 4

| | | Composition by weight | | | Content of grains | | Loose |
|---|---|---|---|---|---|---|---|
| | | $ZrO_2$ (%) | $Al_2O_3$ (%) | Other oxides (%) | Concentration of nodules (number/mm$^2$) | comprising inclusions (%) | packed density (g/cm$^3$) |
| P24 Grit | Comparative | 44.2 | Remainder to 100% | <1.5% | 1488 | 1.1 | 2.14 |
| | Controlled loose packed density | | | | | | 2.06 |
| P36 Grit | Comparative | 42.7 | | | 1040 | 1.48 | 2.06 |
| | Controlled loose packed density | 41.6 44.2 | | | 1081 4842 | 1.45 1 | 1.97 1.95 |
| P40 Grit | Comparative | 45 | | | 2307 | 0.58 | 1.98 |
| | Controlled loose packed density | 44.4 | | | 2885 | 0.8 | 1.93 |
| P50 Grit | Comparative | 44.2 | | | 1488 | 1.1 | 1.97 |
| | Controlled loose packed density | 44.4 42.2 | | | 2140 1387 | 0.62 1.44 | 1.92 |

As is now clearly apparent, present disclosure provides a mixture of fused alumina/zirconia abrasive grains exhibiting a greater lifetime and which is in particular capable of achieving lifetimes 30%, 40% or indeed even 50% greater than those of the current mixtures.

Of course, the present invention is not, however, limited to the embodiments described and represented, and are provided as illustrative and nonlimiting examples.

The invention claimed is:

1. A mixture of fused alumina/zirconia grains comprising, as percentages by weight:

$ZrO_2+HfO_2$: 35-45.5%;
$Al_2O_3$: 43.7-65%;
Other oxides: <10%; and
$SiO_2$: <0.8%;

said mixture having less than 5% of grains comprising inclusions, and at least 50% of examined grains of said mixture having a concentration of nodules of greater than 500 nodules per mm$^2$, said concentration being measured over a cross section of any grain of said mixture, and wherein said mixture has a loose packed density meeting at least one of the following criteria:

(1) more than 97% by weight of the grains do not pass through a sieve of square mesh with a side length of 1400 µM and less than 20% by weight of the grains do not pass through a sieve of square mesh with a side length of 2360 µm, and the loose packed density is greater than 2.18 g/cm$^3$ and less than 2.43 g/cm$^3$;

(2) more than 96% by weight of the grains do not pass through a sieve of square mesh with a side length of 1000 µm and less than 3% by weight of the grains do not pass through a sieve of square mesh with a side length of 1700 and the loose packed density is greater than 2.04 g/cm³ and less than 2.26 g/cm³;

(3) more than 92% by weight of the grains do not pass through a sieve of square mesh with a side length of 600 μm and less than 18% by weight of the grains do not pass through a sieve of square mesh with a side length of 850 μm, and the loose packed density is greater than 1.94 g/cm³ and less than 2.10 g/cm³;

(4) more than 92% by weight of the grains do not pass through a sieve of square mesh with a side length of 425 μm and less than 18% by weight of the grains do not pass through a sieve of square mesh with a side length of 600 μm, and the loose packed density is greater than 1.85 g/cm³ and less than 2.05 g/cm³;

(5) more than 96% by weight of the grains do not pass through a sieve of square mesh with a side length of 300 μm and less than 7% by weight of the grains do not pass through a sieve of square mesh with a side length of 500 μm, and the loose packed density is greater than 1.83 g/cm³ and less than 1.97 g/cm³;

(6) more than 96% by weight of the grains do not pass through a sieve of square mesh with a side length of 250 μm and less than 3% by weight of the grains do not pass through a sieve of square mesh with a side length of 425 μm, and the loose packed density is greater than 1.82 g/cm³ and less than 1.95 g/cm³; or (7) more than 96% by weight of the grains do not pass through a sieve of square mesh with a side length of 150 μm and less than 3% by weight of the grains do not pass through a sieve of square mesh with a side length of 250 μm, and the loose packed density is greater than 1.79 g/cm³ and less than 1.93 g/cm³.

2. The mixture of claim 1, wherein said concentration of nodules is greater than 600 nodules per mm².

3. The mixture of claim 1, wherein said concentration of nodules is less than 3500 nodules/mm².

4. The mixture of claim 1, wherein the loose packed density meets at least one of the following criteria:

(1) more than 97% by weight of the grains do not pass through a sieve of square mesh with a side length of 1400 μm and less than 20% by weight of the grains do not pass through a sieve of square mesh with a side length of 2360 μM, and the loose packed density is greater than 2.22 g/cm³ and less than 2.36 g/cm³;

(2) more than 96% by weight of the grains do not pass through a sieve of square mesh with a side length of 1000 μm and less than 3% by weight of the grains do not pass through a sieve of square mesh with a side length of 1700 μm, and the loose packed density is greater than 2.08 g/cm³ and less than 2.19 g/cm³;

(3) more than 92% by weight of the grains do not pass through a sieve of square mesh with a side length of 600 μM and less than 18% by weight of the grains do not pass through a sieve of square mesh with a side length of 850 μm, and the loose packed density is greater than 1.98 g/cm³ and less than 2.10 g/cm³;

(4) more than 92% by weight of the grains do not pass through a sieve of square mesh with a side length of 425 μm and less than 18% by weight of the grains do not pass through a sieve of square mesh with a side length of 600 μm, and the loose packed density is greater than 1.89 g/cm³ and less than 2.00 g/cm³;

(5) more than 96% by weight of the grains do not pass through a sieve of square mesh with a side length of 300 μm and less than 7% by weight of the grains do not pass through a sieve of square mesh with a side length of 500 μm, and the loose packed density is greater than 1.86 g/cm³ and less than 1.97 g/cm³;

(6) more than 96% by weight of the grains do not pass through a sieve of square mesh with a side length of 250 μm and less than 3% by weight of the grains do not pass through a sieve of square mesh with a side length of 425 μm, and the loose packed density is greater than 1.86 g/cm³ and less than 1.93 g/cm³; or (7) more than 96% by weight of the grains do not pass through a sieve of square mesh with a side length of 150 μm and less than 3% by weight of the grains do not pass through a sieve of square mesh with a side length of 250 μm, and the loose packed density is greater than 1.83 g/cm³ and less than 1.91 g/cm³.

5. The mixture of claim 1, wherein the percentages by weight are:
$ZrO_2+HfO_2$: 38-45.5%;
$Al_2O_3$: 43.7-62%;
Other oxides: <10%; and
$SiO_2$: <0.8%.

6. The mixture of claim 1, wherein the percentages by weight are:
$ZrO_2+HfO_2$: 40-45.5%;
$Al_2O_3$: 43.7-60%;
Other oxides: <10%; and
$SiO_2$: <0.8%.

7. The mixture of claim 1, wherein the grains meeting the criterion (1), (2), (3), (4), (5), (6) or (7) exhibit an F10, P16, P24, P36, P40, P50 or P80 grit respectively, the F10 grit being measured according to the FEPA standard, Standard 42-GB-1984, R1993, of the Fédération Européenne des Fabricants de Produits Abrasifs, Federation of European Producers of Abrasives, and the P16, P24, P36, P40, P50 or P80 grits being measured according to the FEPA standard, Standard 43-GB-1984, R1993, of the Fédération Européenne des Fabricants de Produits Abrasifs.

8. The mixture of claim 1, wherein the proportion of grains having a concentration of nodules, measured over a cross section of any grain of said mixture, of greater than 500 nodules per mm² is at least 90%, as a percentage by number.

9. The mixture of claim 1, wherein the mixture exhibits a content of grains comprising inclusions of at most 2%.

10. The mixture of claim 1, wherein the other oxides comprise at least one additive, said additive being selected from the group consisting of yttrium oxide, titanium oxide, magnesium and calcium oxides, neodymium, lanthanum, cerium, dysprosium and erbium oxides, oxides of any other compound of the family of the rare earth metals, and a mixture of these.

11. The mixture of claim 10, wherein percentages by weight are:
$Y_2O_3$: 0.1-1.2%; and/or
$TiO_2$: <3%; and/or
$SiO_2$: <0.4%.

12. The mixture of claim 1, wherein the content of grains comprising primary zirconia is between 20 and 45%.

13. The mixture of claim 1, wherein the content of grains comprising primary corundum is between 0 and 20%.

14. The mixture of claim 1, wherein the loose packed density meets at least one of the following criteria:

(1) more than 96% by weight of the grains do not pass through a sieve of square mesh with a side length of 1000 μm and less than 3% by weight of the grains do not pass through a sieve of square mesh with a side length of 1700 μm, and the loose packed density is greater than 2.04 g/cm3 and less than 2.17 g/cm³;

(2) more than 92% by weight of the grains do not pass through a sieve of square mesh with a side length of 600 μm and less than 18% by weight of the grains do not pass through a sieve of square mesh with a side length of 850 μm, and the loose packed density is greater than 1.94 g/cm3 and less than 2.05 g/cm$^3$; or (3) more than 92% by weight of the grains do not pass through a sieve of square mesh with a side length of 425 μm and less than 18% by weight of the grains do not pass through a sieve of square mesh with side length of 600 μm, and the loose packed density is greater than 1.85 g/cm3 and less than 1.91 g/cm$^3$.

15. A process for producing the mixture of fused alumina/zirconia grains of claim 1, the method comprising grinding fused alumina/zirconia grains, wherein the grains are ground by a single pass through a mill comprising at least two rolls separated by a distance (e) of less than or equal to 2 mm, and a minimum force for separating the rolls, expressed in kN, being less than $3.1 \times (e)^2 + 22.81 \times (e) + 2$, (e) being expressed in mm.

* * * * *